United States Patent [19]

Mikami et al.

[11] Patent Number: 5,032,968
[45] Date of Patent: Jul. 16, 1991

[54] SWITCHING POWER SOURCE WITH INRUSH CURRENT LIMITING CIRCUIT

[75] Inventors: Toshio Mikami; Shigeo Abe, both of Tsurugashima, Japan

[73] Assignee: Toko Kabushiki Kaisha, Tokyo, Japan

[21] Appl. No.: 496,298

[22] Filed: Mar. 20, 1990

[30] Foreign Application Priority Data

Mar. 23, 1989 [JP] Japan .................................. 1-71051

[51] Int. Cl.$^5$ .................. H02M 3/335; H02M 5/458
[52] U.S. Cl. ........................................ 363/37; 363/49; 363/56
[58] Field of Search ........................... 363/37, 49, 56

[56] References Cited

FOREIGN PATENT DOCUMENTS

| 89574 | 5/1984 | Japan | ..................................... 363/49 |
| 135269 | 6/1987 | Japan | . |
| 278258 | 11/1989 | Japan | . |
| 295669 | 11/1989 | Japan | . |
| 26262 | 1/1990 | Japan | . |

*Primary Examiner*—William H. Beha, Jr.
*Attorney, Agent, or Firm*—Stevens, Davis, Miller & Mosher

[57] ABSTRACT

A switching power source having a rectifier circuit and smoothing capacitor for obtaining a d.c. power from an a.c. input, an oscillator circuit constructed of a serial circuit of a primary winding of a power transformer and a switching element for intermittently turning on and off the d.c. power, the power transformer having another winding of the power transformer for detecting the oscillation state of the oscillator circuit, and a rush current preventing circuit constructed of a parallel circuit of a resistor and a thyristor for turning on the thyristor upon reception of a signal from another winding, the rush current preventing circuit being connected at the input side of the rectifier circuit or between the output side of the rectifier circuit and the smoothing capacitor, the switching power source comprising a detector circuit for generating a signal when the interception period of the a.c. input exceeds a first setting time; and an oscillation stopping circuit for stopping the operation of the oscillator circuit for a second setting time in response to the signal from the detector circuit, and when the a.c. input is supplied at the time other than while the operation of the oscillator circuit is being stopped for the second setting time in response to the signal from the detector circuit, directly starting the operation of the oscillator circuit after a lapse of at least the second setting time after the time when the a.c. input was supplied.

3 Claims, 3 Drawing Sheets

FIG.2a  A.C. INPUT

FIG.2b  D.C. INPUT

FIG.2c  VOLTAGE ACROSS SMOOTHING CAPACITOR C

FIG.2d  OUTPUT OF OSCILLATION STOPPING TIME SETTING CIRCUIT 32

FIG.2e  OUTPUT OF DEAD TIME SETTING CIRCUIT 25

FIG.2f  OUTPUT OF COMPARATOR 26

FIG.2g  OUTPUT OF OUTPUT HOLDING TIME SETTING CIRCUIT 27

FIG.2h  OUTPUT OF COMPARATOR 28

FIG.2i  VOLTAGE ACROSS WINDING L2

SWITCHING POWER SOURCE WITH INRUSH CURRENT LIMITING CIRCUIT

BACKGROUND OF THE INVENTION

The present invention relates to a switching power source capable of reliably preventing a rush current.

As shown in FIG. 3, a conventional switching power source has a smoothing capacitor C or large capacitance coupled across a rectifier circuit 1 which rectifies an a.c. input from a commercial power source 2. A rush current will flow transiently into the capacitor C when an a.c. input from the commercial power source 2 is supplied upon turning-on of a switch or when an a.c. input temporarily intercepted due to an accident is again supplied. In order to eliminate such a rush current, there is provided a rush current preventing circuit 4 at a power source line 3 of the a.c. input. The rush current preventing circuit 4 is constructed of a parallel circuit of a resistor R1 and a thyristor S1.

An oscillator circuit 5 is constructed of a serial circuit of a primary winding L1 of a power transformer T1 and a collector-emitter path of a transistor Q1. The oscillation state is detected by a winding L2. This oscillation detection signal or trigger signal triggers the thyristor S1 to make it turn on. While the thyristor S1 is turned on, the a.c. input passes through this thyristor S1. The transistor Q1 intermittently cuts the d.c. input smoothed by the capacitor C to thereby generate the oscillation.

The trigger voltage to be applied to the gate of the thyristor S1 is obtained by resistors R2 and R3, and diode D1. Reference numeral 6 represents a control circuit for the oscillator circuit 5.

When an a.c. input is initially supplied upon turning-on of a switch, or when an a.c. input is supplied after a temporary interception which caused the voltage of the capacitor C to drop and the oscillation to stop, the thyristor S1 remains turned off. In such a case, an a.c. input current flows into the rectifier circuit 1 via the resistor R1 so that a large rush current will not flow into the capacitor C.

However, upon recovery from an interception of a commercial power source for a very short period which did not cause the oscillation to stop, a rush current cannot be prevented.

In more particular, a conventional switching power source has been so designed that the oscillation remains continued if an a.c. input interception period is short and the voltage across the capacitor C does not drop from a normal value lower than a predetermined amount. Therefore, if the a.c. input is supplied in this condition, a rush current flow into the smoothing capacitor C through the thyristor S1 which still remains turned on because of the continuation of the oscillation.

SUMMARY OF THE INVENTION

It is an object of the present invention to provide a switching power source capable of reliably preventing a rush current even for a short time a.c. input interception which did not cause the oscillation state of the oscillator circuit to stop.

In order to achieve the above object of the invention, there is provided a switching power source having a rectifier circuit and smoothing capacitor for obtaining a d.c. power from an a.c. input, an oscillator circuit constructed of a serial circuit of a primary winding of a power transformer and a switching element for intermittently turning on and off the d.c. power, the power transformer having the another winding coupled to the primary winding for detecting the oscillation of the oscillator circuit, and a rush current preventing circuit constructed of a parallel circuit of a resistor and a thyristor for turning on the thyristor upon reception of a signal from the other winding, the rush current preventing circuit being connected at the input side of the rectifier circuit or between the output side of the rectifier circuit and the smoothing capacitor, the switching power source comprising: a detector circuit for generating a signal when the interception period of the a.c. input exceeds a first setting time; and an oscillation stopping circuit for stopping the operation of the oscillator circuit for a second setting time in response to the signal from the detector circuit, and when the a.c. input is supplied at the time other than while the operation of the oscillator circuit is being stopped for the second setting time in response to the signal from the detector circuit, directly starting the operation of the oscillator circuit after a lapse of at least the second setting time after the time when the a.c. input was supplied.

The detector circuit comprises a first circuit for detecting a lapse of the first portion of two portions obtained by dividing the first setting time, and a second circuit responsive to a signal from the first circuit for detecting a lapse of the remaining portion of the two portions of the first setting time, a signal from the second circuit being applied as a signal from the detector circuit to the oscillation stopping circuit.

DETAILED DESCRIPTION OF THE PREFERRED EMBODIMENT

Figure 3:
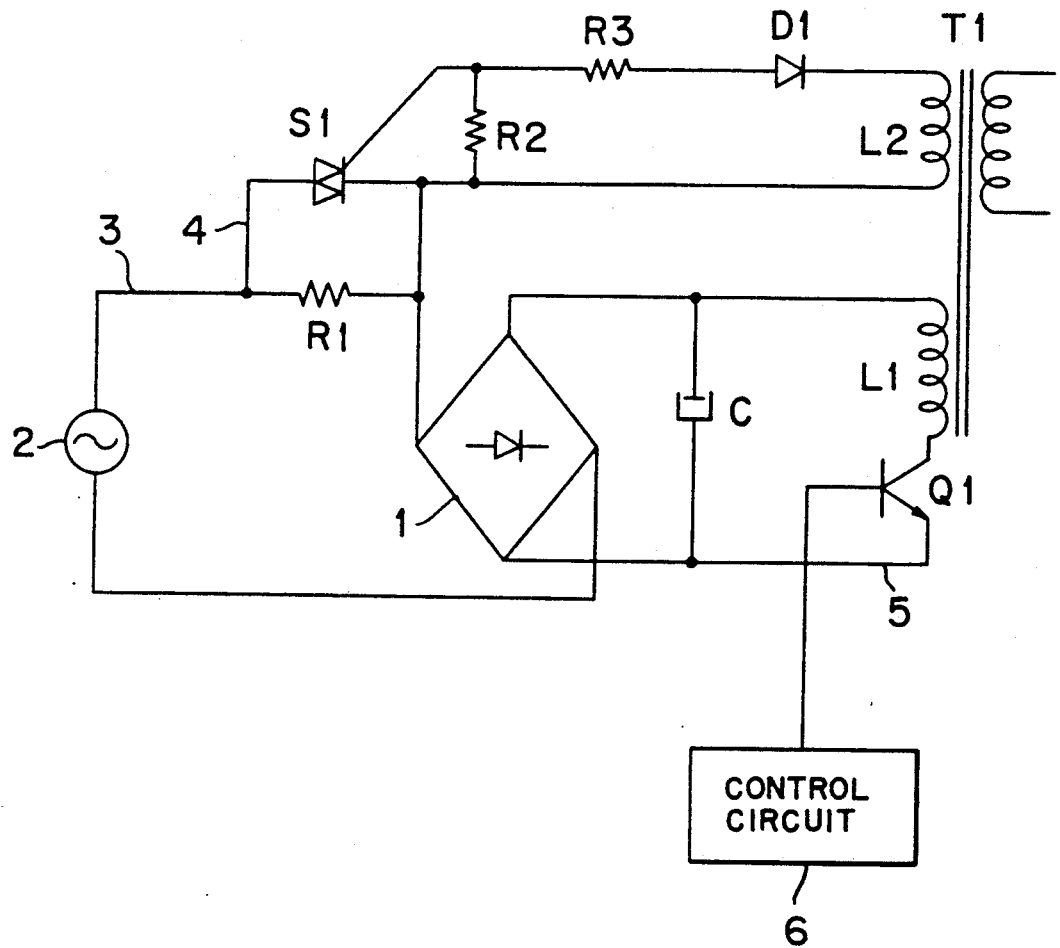
FIG. 3 is a circuit diagram of a conventional switching power source.

An embodiment of the switching power source of this invention will be described with reference to the circuit diagram of FIG. 1. Like elements to those shown in FIG. 3 are represented by using identical reference numerals.

Figure 1:
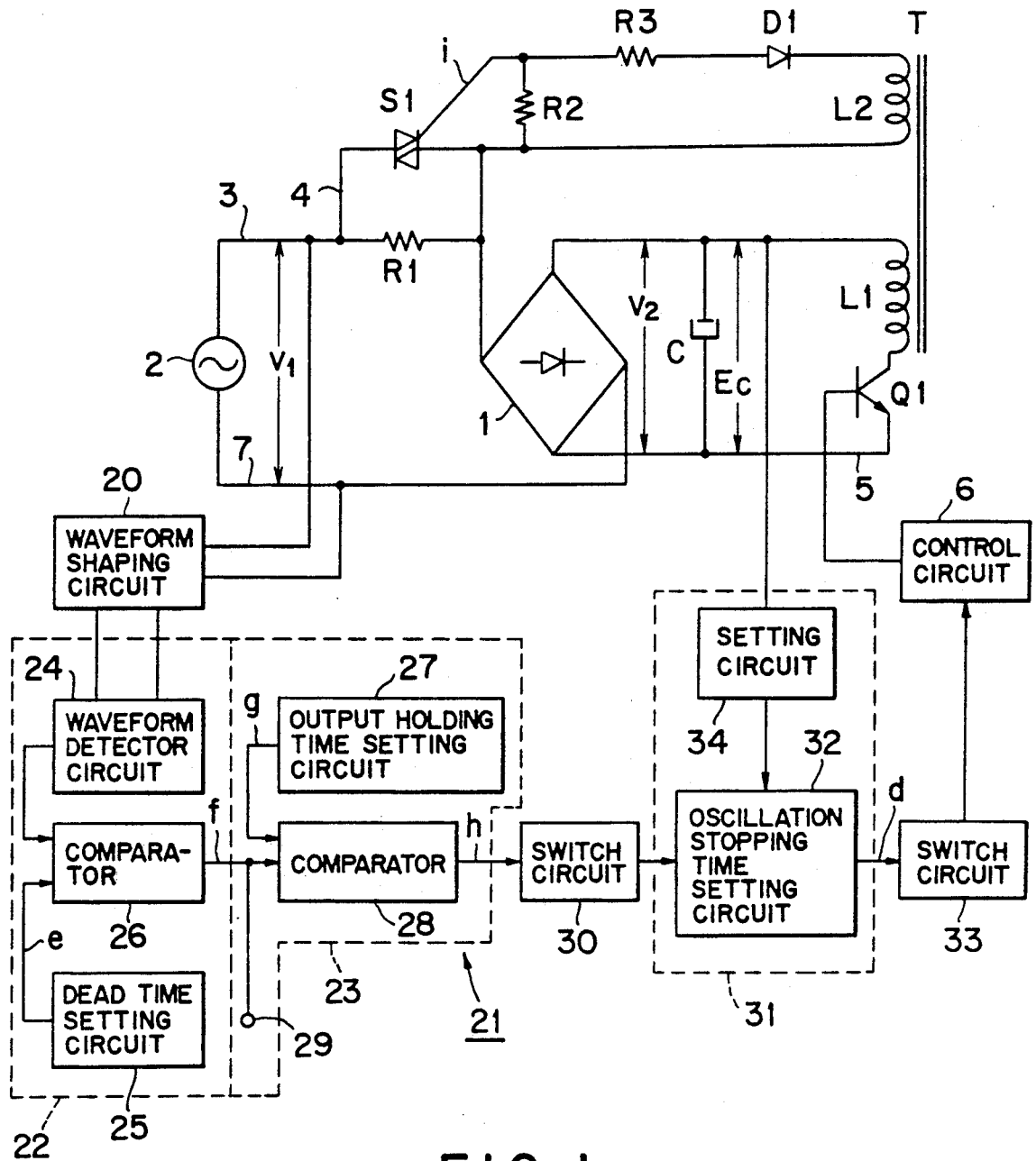
FIG. 1 is a circuit diagram showing an embodiment of the switching power source according to this invention.

Referring to FIG. 1, a smoothed d.c. power is obtained from an a.c. input of a commercial power supply 2 by using a rectifier circuit 1 and a smoothing capacitor C.

An oscillator circuit 5 is connected across the smoothing capacitor C. The oscillator circuit 5 is constructed of a serial circuit of a primary winding L1 of a power transformer T and a collector-emitter path which is the main current path of a switching transistor Q1. The oscillation state of the oscillator circuit 5 is controlled by a signal from a control circuit 6 connected to the base of the transistor Q1. The oscillation may be generated by a known external- or self-oscillation. Secondary windings and their rectifier circuits for obtaining d.c. outputs are omitted in FIG. 1 because they are not the main part of this invention.

There is provided at a power source line 3 of the a.c. input a rush current preventing circuit 4 constructed of a parallel circuit of a resistor R1 and a thyristor S1. The gate of the thyristor S1 is connected to one end of a winding L2 of the power transformer T via a resistor R3 and a diode D1, and to the power source line 3 via a resistor R2. The other end of the winding L2 is connected to the power source line 3.

Across the power source lines 3 and 7 of an a.c. input from the commercial power source 2, there is connected a detector circuit 21 via a waveform shaping circuit 20.

The detector circuit 21 has a function to detect a short time a.c. input interception by using a first setting time, and is constructed of first and second circuits 22 and 23.

The first circuit 22 is constructed of a waveform detector circuit 24, dead time setting circuit 25 and comparator 26. The waveform detector circuit 24 generates a signal corresponding to the level of an a.c. input rectified and smoothed at the waveform shaping circuit 20. The dead time setting circuit 25 generates a signal e for setting a time or dead time during which an a.c. input interception of the switching power source can be neglected.

The signals from the waveform detector circuit 24 and dead time setting circuit 25 are inputted to the comparator 26 wehich generates a signal f when an a.c. input is not present after the end of the dead time. Reference numeral 29 represents a terminal from which the signal f of the comparator 26 is supplied to other electronic apparatus which may be affected when the output from the switching power source is lowered or stopped due to the a.c. input interception.

The second circuit 23 is constructed of an output holding time setting circuit 27 and comparator 28, the second circuit generating a signal h upon detection of an a.c. input interception still continuing after the output holding time. The output holding time setting circuit 27 generates a signal g for setting an output holding time during which the output of the switching power source is required to be held, while the a.c. input is intercepted. The output holding time is a time previously determined at the time of circuit design, during which time the output of the switching power source is required to be held in order to supply power to other electronic apparatus while the a.c. input is intercepted.

The signal g and signal f from the comparator 26 are applied to the comparator 28 which outputs the signal h while an a.c. input is still intercepted after the end of the output holding time. The setting of the output holding time by the output holding time setting circuit 27 is carried out while the signal f is generated from the comparator 26. The sum of the setting times set by the dead time setting circuit 25 and output holding time setting circuit 27 constitutes the first setting time.

The signal h from the comparator 28 is applied as an output signal of the detector circuit 21 to an oscillation stopping circuit 31 via a switch circuit 30.

The oscillation stopping circuit 31 is constructed of an oscillation stopping time setting circuit 32 and a setting circuit 34 The oscillation stopping time setting circuit 32 generates a signal d for setting a second setting time when the signal h of the comparator 28 is applied thereto. The signal from the oscillation stopping time setting circuit 32 is applied to a control circuit 6 of the oscillator circuit 5 via a switch circuit 33. Upon reception of this signal, the oscillator circuit 5 stops its oscillation for the second setting time.

The second setting time is set at a time during which the voltage across the smoothing capacitor C reaches a voltage which does not allow a rush current after the a.c. input is supplied. This second setting time of generally several hundreds msec is set in the following manner. Namely, the second setting time is set at a time during which the voltage across the smoothing capacitor C reaches a voltage which does not allow a rush current larger than a value previously determined at the time of circuit design, after the a.c. input is supplied under the condition that there is no output from the switching power source, i.e., under the condition that there is no voltage across the smoothing capacitor. If the a.c. input is supplied under the condition that there is an output from the switching power source after the a.c. input interception, the time required for the voltage across the smoothing capacitor C reaches a voltage which does not allow a rush current, is shorter than the time for the case where the a.c. input is supplied under the condition that there is no output from the switching power source. Therefore, the second setting time as set in the manner described above is sufficient for both the conditions.

When the a.c. input is supplied at the time other than while the operation of the oscillator circuit 5 is stopped upon application of an output signal from the detector circuit 21, the oscillation stopping circuit 31 also operates to directly start the oscillation of the oscillator circuit 5 after a lapse of at least the second setting time after the a.c. input was supplied. In this case, the a.c. input is supplied under the condition that there is scarcely any output from the switching power source or under the similar condition. In order to directly start the oscillation of the oscillator circuit 5, a signal from the setting circuit 34 connected to the output side of the rectifier circuit 34 is supplied to the oscillation stopping time setting circuit 32, without application of a signal from the detector circuit 21.

Figure 2:
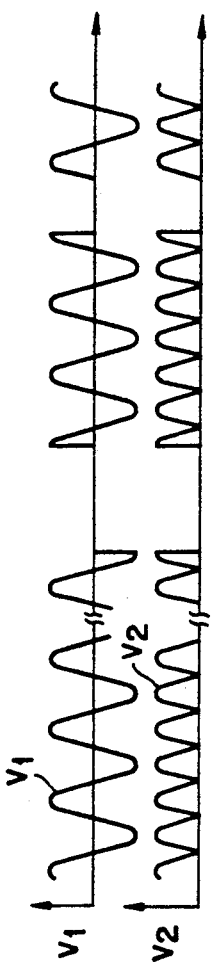
FIGS. 2a -2i show waveforms at various circuit portions of the switching power source shown in FIG. 1.

The operation of the switching power source constructed as above will be described with reference to FIG. 2 which shows voltage and current waveforms at various circuit portions of the switching power source The ordinates of FIG. 2 represent an a.c. input v1, d.c. input v2, voltage Ec across the smoothing capacitor C, output signals d to h from the oscillation stopping time setting circuit 32, dead time setting circuit 25, comparator 26, output holding time setting circuit 27, and comparator 28, and a voltage i across the switching L2. The abscissa represents a time.

When the a.c. input is supplied under the condition that there is no output from the switching power source, the setting circuit 34 causes the oscillation stopping time setting circuit 32 to directly generate the signal d for setting the second setting time at time t1. This case occurs when the a.c. input is initially supplied, or it is supplied after a long time a.c. input interception.

The signal d terminates at time t2 when the second setting time lapses. The oscillation circuit 5 does not start operating from time t1 to time t2, so that no voltage is generated across the winding L2. The a.c. input current therefore flows into the rectifier circuit 1 via the resistor R1 of the rush current preventing circuit 4.

At time t2 when the second setting time lapses, the voltage across the smoothing capacitor C has already reached a normal voltage at which the switching power source operates. When the signal d of the oscillation stopping time setting circuit 32 disappears, the oscillator circuit 5 starts oscillating. In this condition, the a.c. input current flowing into the thyristor S1 of the rush current preventing circuit 4 does not make a rush current. Even if the normal voltage is not obtained at time t2, the voltage across the smoothing capacitor C may be a voltage which does not allow a rush current upon turning-on of the thyristor S1 caused by the voltage i across the winding L2.

When the a.c. input is intercepted at time t3, the dead time setting circuit 25 of the first circuit 22 generates the signal e for setting the time during which the a.c. input interception of the switching power source can be neglected, i.e., the dead time. The signal e terminates at time t4. The period from time t3 to t4 is generally in the order of 10 msec during which the voltage across the smoothing capacitor C drops scarcely When the comparator detects that the a.c. input is still absent at time t4, it generates the signal f which is then supplied to the comparator 26 of the second circuit 23. At the same time the output holding time setting circuit 27 generates the signal g for setting an output holding time during which the output of the switching power source is required to be held while the a.c. input is intercepted and the signal g is applied to the comparator 28. The signal f of the comparator 26 is also supplied via the terminal 29 to other electronic apparatus which are supplied power from the switching power source. This signal f instructs the other electronic apparatus to prepare for the interception of power supply. During the output holding time from time t4 to t5 after the dead time, the voltage across the smoothing capacitor C slightly lowers.

Accordingly, the preparation for the interception of power supply to the other electronic apparatus to be caused by the a.c. input interception of the switching power source has been completed at time t5. For example, if an electronic apparatus is a memory device, this device is connected to a power source prepared for power failure, the memory contents are transferred to a memory prepared for power failure, or other suitable measures are carried out. The output holding time is generally set at 10 to 20 msec.

When the comparator 28 detects that the a.c. input is still absent at time t5, it generates the signal h which is supplied as a signal from the detector circuit 21 to the oscillation stopping circuit 31 via the switch circuit 30.

At time t5 when the signal h of the comparator 28 is applied, the oscillation stopping time setting circuit 32 generates the signal d for setting the second setting time which signal is supplied to the control circuit 6 of the oscillator circuit 5 via the switch circuit 33. Upon reception of this signal d the oscillation circuit 5 stops its oscillation for the second setting time so that the voltage across the winding L2 disappears.

The rush current preventing circuit 4 then turns off the thyristor S1 to enter the state where the a.c. input passes through the resistor R1 upon recovery of the a.c. input.

The voltage across the smoothing capacitor C rapidly drops to the minimum voltage which can maintain the oscillation state or a voltage lower than the minimum voltage.

When the a.c. input is again supplied at time t6, it passes via the resistor R1 of the rush current preventing circuit 4 into the smoothing capacitor C to raise its voltage Ec. If the oscillation operation of the oscillator circuit 5 continues at time t6 as in the prior circuit, there will flow a rush current.

At time t7 when the second setting time terminates and the oscillator circuit 5 starts operating, the voltage Ec across the smoothing capacitor C has a normal value so that a rush current will not flow even while the thyristor S1 is turned on.

It is assumed in FIG. 2 that the operation of the switching power source as a whole continues to operate after starting from time t1. There is a case, however, wherein the switching power source as a whole stops its operation and returns to the state before time t1 if the a.c. input is not supplied until near time t7 when the second setting time terminates, because the voltage Ec across the smoothing capacitor C becomes substantially zero.

Next, in the case wherein the a.c. input is intercepted at time t8 and it is again supplied during the output holding time from time t9 to time t10 after the dead time which terminated at time t9, although the comparator 26 generates the signal f, the comparator 28 does not generate the signal h. The oscillator circuit 5 therefore continues its operation so that the a.c. input current flows via the thyristor S1 of the rush current preventing circuit 4 into the smoothing capacitor. In this case however, since the voltage Ec of the smoothing capacitor C has lowered only a small amount, there will not flow a rush current. Although not shown in FIG. 2, if the a.c. input is supplied during the dead time between times t8 and t9, both the comparators 28 and 26 do not generate the signals so that it is apparent that a rush current will not flow.

In the above embodiment, the detector circuit 21 is constructed of the first and second circuits 21 and 22. If there is no need of instructing other electronic apparatus to prepare for the interception of power supply from the switching power source, the signal of the comparator 26 is not needed to be supplied from the terminal 29 and the second circuit 23 can be omitted In this case, the single first circuit 22 detects the interception of an a.c. input which exceeds the first setting time, and the first setting time is set such that the output holding time be slightly longer than the dead time.

The oscillator circuit is not limited to a single transistor type as shown, but a two-transistor type such as half-bridge type may also be used.

The rush current preventing circuit 4 may be connected between the rectifier circuit 1 and the smoothing capacitor C.

According to the present invention, the switching power source is constructed such that if the interception of the a.c. input continues longer than the momentary period such as the dead time and output holding time the voltage Ec drop across the smoothing capacitor during which can be neglected, the operation of the oscillator circuit is stopped by the oscillation stopping circuit. The interception continuing over such a momentary period is detected by the detector circuit by using the first setting time. The stop of the operation of the oscillator circuit continues for the second setting time. This second setting time is a time during which the voltage Ec across the smoothing capacitor reaches a voltage which does not allow a rush current when the a.c. input is supplied. The second setting time is preferably set at a time during which the normal voltage is obtained starting from substantially zero voltage Ec across the smoothing capacitor.

The switch circuits 30 and 33 serve to amplify the signals inputted thereto and reliably transfer the signals. The switch circuits 30 and 33 may be omitted in some cases.

As described so far, according to the present invention, if the a.c. input is intercepted for a short time to the extent that the voltage across the smoothing capacitor drops to a certain level, the operation of the oscillator circuit is stopped so that if the a.c. input is again supplied, a rush current will not occur even if the voltage across the smoothing capacitor is maintained low.

A rush current can be reliably prevented accordingly for both the cases where an a.c. input is initially supplied upon turning on a switch and where an a.c. input is supplied after the interception for a short time.

What is claimed is:

1. A switching power source having a rectifier circuit and smoothing capacitor for obtaining a d.c. power from an a.c. input, an oscillator circuit constructed of a serial circuit of a primary winding of a power transformer and a switching element for intermittently turning on and off the d.c. power, the power transformer having another winding of the power transformer for detecting the oscillation state of the oscillator circuit, and a rush current preventing circuit constructed of a parallel circuit of a resistor and a thyristor for turning on the thyristor upon reception of a signal from another winding, the rush current preventing circuit being connected at the input side of the rectifier circuit or between the output side of the rectifier circuit and the smoothing capacitor, said switching power source comprising:

a detector circuit for generating a signal when the interception period of the a.c. input exceeds a first setting time; and an oscillation stopping circuit for stopping the operation of said oscillator circuit for a second setting time in response to the signal from said detector circuit, and when the a.c. input is supplied at the time other than while the operation of said oscillator circuit is being stopped for said second setting time in response to the signal from said detector circuit, directly starting the operation of said oscillator circuit after a lapse of at least said second setting time after the time when the a.c. input was supplied.

2. A switching power source according to claim 1, wherein said detector circuit comprising a first circuit for detecting a lapse of the first portion of two portions obtained by dividing said first setting time, and a second circuit responsive to a signal from said first circuit for detecting a lapse of the remaining portion of said first setting time, a signal from said second circuit being applied as a signal from said detector circuit to said oscillation stopping circuit 3. A switching power source according to claim 2, wherein said first portion of said first setting time is a dead time during which an a.c. input interception can be neglected, said remaining portion is an output holding time during which an output of the switching power source is required to be held after a lapse of said dead time, and said second setting time is a time during which the voltage across said smoothing capacitor becomes a voltage which does by no means not allow a rush current when the a.c. input is supplied.

* * * * *